US012183245B2

(12) United States Patent
Jeon et al.

(10) Patent No.: US 12,183,245 B2
(45) Date of Patent: Dec. 31, 2024

(54) OPTICAL COMPENSATING SYSTEM AND METHOD

(71) Applicant: LG Display Co., Ltd., Seoul (KR)

(72) Inventors: JaeSung Jeon, Seoul (KR); Hyeonju Park, Incheon (KR); Hyeonwoo Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/523,299

(22) Filed: Nov. 29, 2023

(65) Prior Publication Data

US 2024/0257691 A1 Aug. 1, 2024

(30) Foreign Application Priority Data

Jan. 27, 2023 (KR) ........................ 10-2023-0010960

(51) Int. Cl.
*G09G 3/20* (2006.01)

(52) U.S. Cl.
CPC ......... *G09G 3/2007* (2013.01); *G09G 3/2096* (2013.01); *G09G 2320/0626* (2013.01); *G09G 2320/0673* (2013.01); *G09G 2360/145* (2013.01); *G09G 2360/16* (2013.01)

(58) Field of Classification Search
CPC ............... G09G 3/2007; G09G 3/2096; G09G 2320/0626; G09G 2320/0673; G09G 2360/145; G09G 2360/16; G09G 3/006
See application file for complete search history.

(56) References Cited

U.S. PATENT DOCUMENTS

| | | | | |
|---|---|---|---|---|
| 2020/0126497 | A1* | 4/2020 | Wang | G09G 5/10 |
| 2021/0049966 | A1* | 2/2021 | Hsu | G09G 3/3258 |
| 2022/0020309 | A1* | 1/2022 | Jiao | G09G 3/2074 |
| 2022/0148492 | A1* | 5/2022 | Yoon | G09G 5/10 |

* cited by examiner

*Primary Examiner* — Andrew Sasinowski
(74) *Attorney, Agent, or Firm* — Seed IP Law Group LLP

(57) ABSTRACT

Embodiments of the disclosure relate to an optical compensating system and method. Specifically, there may be provided an optical compensating method, comprising generating a first photographed image for a first area of a display panel including an overlapping area, generating a second photographed image for a second area of the display panel including the overlapping area, extracting a camera gamma value for the second area, calculating a reference grayscale value in the overlapping area, using the camera gamma value for the second area, generating a corrected luminance value of the overlapping area by applying weights on the basis of the position to the reference grayscale value, generating compensation data from the corrected luminance value, and transmitting the compensation data to a display device.

17 Claims, 9 Drawing Sheets

| | OI2 | GSR |
|---|---|---|
| Weight | 1> W1 > 0 | W2 = 1 − W1 |

OPTICAL COMPENSATING SYSTEM AND METHOD

CROSS-REFERENCE TO RELATED APPLICATION

This application claims priority from Korean Patent Application No. 10-2023-0010960, filed on Jan. 27, 2023, which is hereby incorporated by reference for all purposes as if fully set forth herein.

BACKGROUND

Technical Field

Embodiments of the disclosure relate to an optical compensating system and method, and to an optical compensating system and method capable of compensating for gap in an overlapping area of a plurality of photographed images.

Description of Related Art

With the development of the information society, various needs for display devices that display images are increasing, and various types of display devices, such as liquid crystal displays, organic light emitting displays, etc., are being utilized.

Among these display devices, the organic light emitting display device uses self-emissive organic light emitting diodes, providing advantages, such as a fast response and better contrast ratio, luminous efficiency, luminance, and viewing angle.

The organic light emitting display device may include organic light emitting diodes respectively arranged in a plurality of subpixels disposed on a display panel and cause each subpixel to emit light by controlling the driving current flowing to the organic light emitting diode to display images.

The subpixels formed in the display device may not have uniform luminance due to various reasons. For example, the luminance uniformity of the display device may vary due to process variations in the display panel, variations in the electrical characteristics of the driving transistors that control the subpixels, variations in the driving voltage applied to the subpixels, and variations in the degradation of the light emitting elements that comprise the subpixels.

To compensate for the luminance deviation, compensation data for each subpixel may be generated from the photographed image of the display panel, and the compensation data may be applied when supplying data voltage to the display panel to reduce the luminance deviation between subpixels and improve the luminance uniformity.

BRIEF SUMMARY

Inventors recognized that in the case of large display panels, the camera takes more than one shot to generate multiple images, which may cause errors in the compensation data due to the gap in the overlapping areas. Accordingly, the inventors of the disclosure have invented an optical compensating system and method capable of enhancing the accuracy of compensation data for large display panels.

Embodiments of the disclosure may provide an optical compensating system and method capable of enhancing the accuracy of compensation data by mitigating the luminance deviation in the overlapping area where a plurality of photographed images overlap.

Embodiments of the disclosure may provide an optical compensating system and method capable of mitigating the luminance deviation in the overlapping area by adjusting the grayscale values in the overlapping area based on the camera gamma value for camera luminance.

Embodiments of the disclosure may provide an optical compensating method, comprising generating a first photographed image for a first area of a display panel including an overlapping area, generating a second photographed image for a second area of the display panel including the overlapping area, extracting a camera gamma value for the second area, calculating a reference grayscale value in the overlapping area, using the camera gamma value for the second area, generating a corrected luminance value of the overlapping area by applying weights on the basis of position to the reference grayscale value, generating compensation data from the corrected luminance value, and transmitting the compensation data to a display device.

Embodiments of the disclosure may provide an optical compensation device, comprising a camera generating a photographed image for a display panel displaying a test image, a data converting module converting a first photographed image for a first area of the display panel including an overlapping area and a second photographed image for a second area of the display panel including the overlapping area into luminance data, a camera gamma value generating module generating a camera gamma value from the second photographed image, a reference grayscale value generating module generating a reference grayscale value of the overlapping area using the camera gamma value, a corrected luminance value generating a corrected luminance value of the overlapping area by applying weights on the basis of position to the reference grayscale value, a compensation data generating module generating compensation data using the corrected luminance value, and a weight table storing the weight.

Embodiments of the disclosure may provide a display device, comprising a display panel including a plurality of subpixels having a light emitting element, a gate driving circuit supplying a plurality of scan signals to the display panel, a data driving circuit supplying a data voltage to the display panel, a memory storing compensation data, and a timing controller compensating for the data voltage using the compensation data, wherein the compensation data is generated by generating a first photographed image for a first area of the display panel including an overlapping area, generating a second photographed image for a second area of the display panel including the overlapping area, extracting a camera gamma value for the second area, calculating a reference grayscale value in the overlapping area, using the camera gamma value for the second area, generating a corrected luminance value of the overlapping area by applying weights on the basis of position to the reference grayscale value, and generating the compensation data from the corrected luminance value.

According to embodiments of the disclosure, it is possible to enhance the accuracy of compensation data for a large display panel.

According to embodiments of the disclosure, it is possible to enhance the accuracy of compensation data by mitigating the luminance deviation in the overlapping area where a plurality of photographed images overlap.

According to embodiments of the disclosure, it is possible to mitigate the luminance deviation in the overlapping area by adjusting the grayscale values in the overlapping area based on the camera gamma value for camera luminance.

DESCRIPTION OF THE SEVERAL VIEWS OF THE DRAWINGS

The above and other characteristics, features, and technical benefits of the disclosure will be more clearly understood from the following detailed description, taken in conjunction with the accompanying drawings, in which.

DETAILED DESCRIPTION

Figure 1:
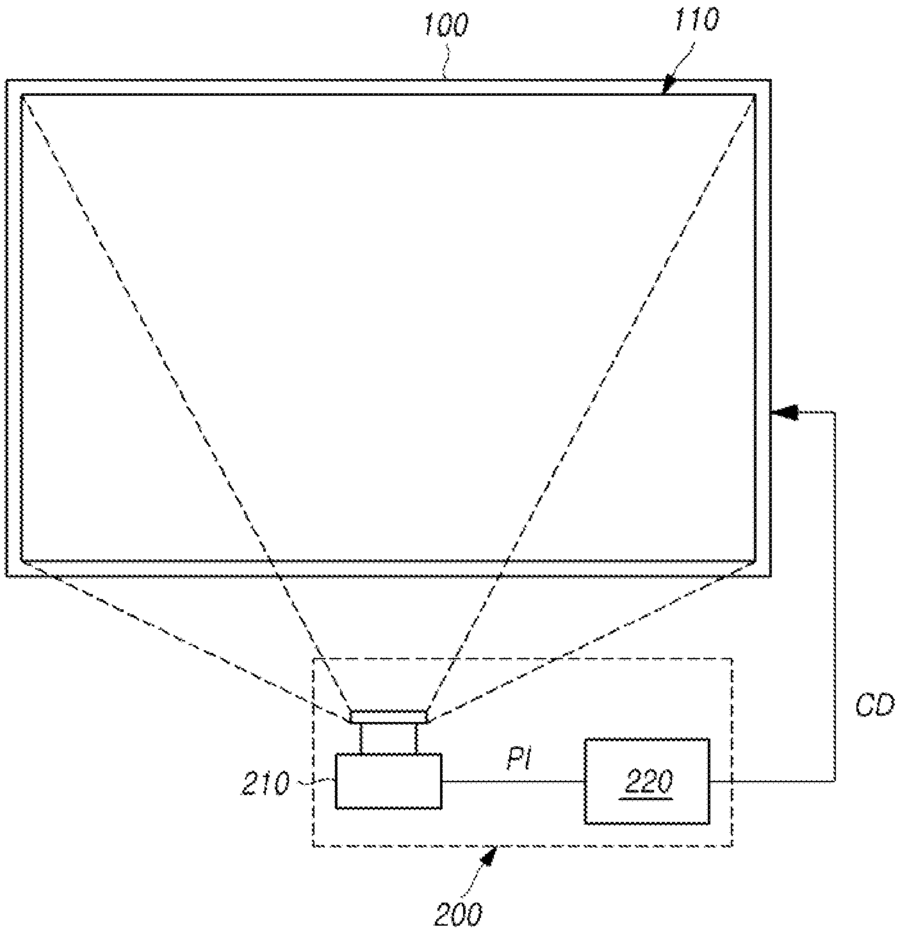
FIG. 1 is a view schematically illustrating an optical compensating system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

A "predetermined" value, parameter, threshold, condition or setting can be dynamically determined or adjusted by a machine with or without human inputs. A "predetermined" value, parameter, threshold, condition or setting does not mean or limit to that the value, parameter, threshold, condition or setting is fixed or is input by a human.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the disclosure will be described in detail with reference to the accompanying drawings.

FIG. 1 is a view schematically illustrating an optical compensating system according to embodiments of the disclosure.

Referring to FIG. 1, an optical compensating system according to embodiments of the disclosure may include a display device 100 and an optical compensation device 200.

The display device 100 is a device that displays an image through the display panel 110, and may be various types of devices, such as a liquid crystal display (LCD) and an organic light emitting display (OLED).

The optical compensation device 200 may include a camera 210 capable of photographing the display panel 110 constituting the display device 100 and a compensation data processing unit 220 generating compensation data CD using the photographed image PI generated by the camera 210.

The camera 210 may photograph the display panel 110 and generate a photographed image PI of the surface of the display panel 110. For example, the optical compensation device 200 may display a test image including a plurality of dot-shaped calibration points in a black or white background color on the display panel 110 and photograph the display panel 110 through the camera 210 to generate a photographed image PI.

The photographed image PI generated by the camera 210 may include luminance information about a plurality of subpixels SP formed on the display panel 110.

The compensation data processing unit 220 extracts luminance data according to the position of the display panel 110 based on the photographed image PI generated by the camera 210 and generates compensation data CD capable of compensating for it.

The display device 100 may enhance image quality by compensating for the data voltage supplied to the display panel 110 based on the compensation data CD provided from the optical compensation device 200.

Figure 2:
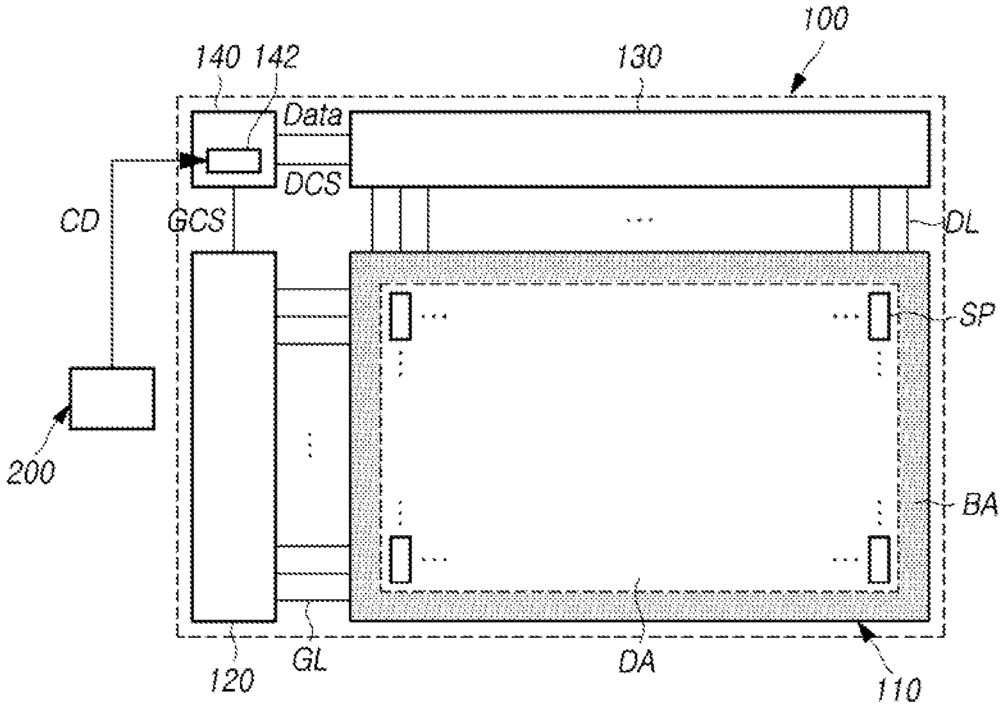
FIG. 2 is a view schematically illustrating the concept of displaying an image using compensation data of an optical compensation device by a display device in an optical compensating system according to embodiments of the disclosure.

FIG. 2 is a view schematically illustrating the concept of displaying an image using compensation data of an optical compensation device by a display device in an optical compensating system according to embodiments of the disclosure.

Referring to FIG. 2, in an optical compensating system according to embodiments of the disclosure, a display device 100 may include a display panel 110 and a driving circuit for driving the display panel 110.

The display panel 110 may include a display area DA in which images are displayed and a bezel area BA in which no image is displayed. The bezel area BA may also be referred to as a non-display area.

The display panel 110 may include a plurality of subpixels SP for displaying images. For example, a plurality of subpixels SP may be disposed in the display area DA. In some cases, at least one subpixel SP may be disposed in the bezel area BA. At least one subpixel SP disposed in the bezel area BA is also referred to as a dummy subpixel.

The display panel 110 may include a plurality of signal lines for driving a plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixel SP. For example, the other signal lines may include driving voltage lines and reference voltage lines.

For example, when one pixel in the display device 100 having a resolution of 2,208×2,752 includes three subpixels SP of red (R), green (G), and blue (B), there may be provided 2,208 gate lines GL and a total of 2,752×3=8,256 data lines DL (2,752 data lines DL connected to each of three subpixels RGB), and the subpixel SP may be disposed at the intersection between the gate line GL and the data line DL.

The plurality of data lines DL and the plurality of gate lines GL may cross each other. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction.

The driving circuit may include a data driving circuit 130 for driving a plurality of data lines DL and a gate driving circuit 120 for driving a plurality of gate lines GL. The driving circuit may further include a timing controller 140 for controlling the data driving circuit 130 and the gate driving circuit 120.

The data driving circuit 130 is a circuit for driving the plurality of data lines DL, and may output data signals (also referred to as data voltages) corresponding to image signals to the plurality of data lines DL. The gate driving circuit 120 is a circuit for driving the plurality of gate lines GL and may generate gate signals, and output the gate signals to the plurality of gate lines GL. The gate signal may include one or more scan signals and light emission signals.

The timing controller 140 may start a scan according to the timing implemented in each frame and may control data driving at an appropriate time according to the scan. The timing controller 140 may convert the image signal input from an external host system (not shown in the drawings) into image data Data according to the data signal format used in the data driving circuit 130 and supply it to the data driving circuit 130.

The timing controller 140 may include a memory 142. The memory 142 may be positioned outside the timing controller 140, but in the shown example, the memory 142 is positioned inside the timing controller 140. The memory 142 may store compensation data CD transferred from the optical compensation device 200.

Accordingly, the timing controller 140 converts the image signal input from the host system into image data by reflecting the compensation data CD stored in the memory 142. Therefore, the data signal supplied to the display panel 110 through the data driving circuit 130 may reflect the luminance deviation of the display panel 110, so that the quality of the image displayed through the display panel 110 may be enhanced.

Further, the timing controller 140 may receive display driving control signals from an external host system. For example, the display driving control signals may include a vertical synchronizing signal, a horizontal synchronizing signal, an input data enable signal, and a clock signal.

The timing controller 140 may generate the data driving control signal DCS and the gate driving control signal GCS based on display driving control signals input from the host system. The timing controller 140 may control the driving operation and driving timing of the data driving circuit 130 by supplying the data driving control signal DCS to the data driving circuit 130. The timing controller 140 may control the driving operation and driving timing of the gate driving circuit 120 by supplying the gate driving control signal GCS to the gate driving circuit 120.

The data driving circuit 130 may include one or more source driving integrated circuits SDIC. Each source driving integrated circuit may include a shift register, a latch circuit, a digital to analog converter (DAC), an output buffer, and the like. In some cases, each source driving integrated circuit may further include an analog to digital converter (ADC).

For example, each source driving integrated circuit may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 120 may output a gate signal of a turn-on level voltage or a gate signal of a turn-off level voltage according to the control of the timing controller 140. The gate driving circuit 120 may sequentially drive the plurality of gate lines GL by sequentially supplying gate signals of the turn-on level voltage to the plurality of gate lines GL.

The gate driving circuit 120 may include one or more gate driving integrated circuits GDIC.

The gate driving circuit 120 may be connected with the display panel 110 by TAB method or connected to a bonding pad of the display panel 110 by a COG or COP method or may be connected with the display panel 110 according to a COF method. Alternatively, the gate driving circuit 120 may be formed, in a gate in panel (GIP) type, in the bezel area BA of the display panel 110. The gate driving circuit 120 may be disposed on the substrate or may be connected to the substrate. In other words, the gate driving circuit 120 that is of a GIP type may be disposed in the bezel area BA of the substrate. The gate driving circuit 120 that is of a chip-on-glass (COG) type or chip-on-film (COF) type may be connected to the substrate.

Meanwhile, at least one of the data driving circuit 130 and the gate driving circuit 120 may be disposed in the display area DA. For example, at least one of the data driving circuit 130 and the gate driving circuit 120 may be disposed not to overlap the subpixels SP or to overlap all or some of the subpixels SP.

The data driving circuit 130 may be connected to one side (e.g., an upper or lower side) of the display panel 110. Depending on the driving scheme or the panel design scheme, the data driving circuit 130 may be connected with both sides (e.g., upper and lower sides) of the self-emission display panel 110, or two or more of the four sides of the self-emission display panel 110.

The gate driving circuit 120 may be connected with one side (e.g., a left or right side) of the display panel 110. Depending on the driving scheme or the panel design scheme, the gate driving circuit 120 may be connected with both sides (e.g., left and right sides) of the display panel 110, or two or more of the four sides of the display panel 110.

The timing controller 140 may be implemented as a separate component from the data driving circuit 130, or the timing controller 140 and the data driving circuit 130 may be integrated into an integrated circuit (IC). The timing controller 140 may be a controller used in typical display technology or a control device that may perform other control functions as well as the functions of the timing controller, or a circuit in the control device. The timing controller 140 may be implemented as various circuits or electronic components, such as an integrated circuit (IC), a field programmable gate array (FPGA), an application specific integrated circuit (ASIC), or a processor.

The timing controller 140 may be mounted on a printed circuit board or a flexible printed circuit and may be electrically connected with the data driving circuit 130 and the gate driving circuit 120 through the printed circuit board or the flexible printed circuit. The timing controller 140 may transmit/receive signals to/from the data driving circuit 130 according to one or more predetermined interfaces. The interface may include, e.g., a low voltage differential signaling (LVDS) interface, an EPI interface, and a serial peripheral interface (SP).

The display device 100 according to embodiments of the disclosure may be a self-emissive display device in which the display panel 110 emits light by itself. When the display device 100 according to the embodiments of the disclosure is a self-emissive display device, each of the plurality of subpixels SP may include a light emitting element. For example, the display device 100 according to embodiments of the disclosure may be an organic light emitting diode display in which the light emitting element is implemented as an organic light emitting diode (OLED).

As another example, the display device 100 according to embodiments of the disclosure may be an inorganic light emitting display device in which the light emitting element is implemented as an inorganic material-based light emitting diode. As another example, the display device 100 according to embodiments of the disclosure may be a quantum dot display device in which the light emitting element is implemented as a quantum dot which is self-emission semiconductor crystal.

In the case of a large-scale display panel 110, it is difficult to photograph the display panel 110 at one time using the camera 210. Thus, compensation data CD is generated by generating a plurality of photographed images PI through photographing two or more times and merging them.

Figure 3:
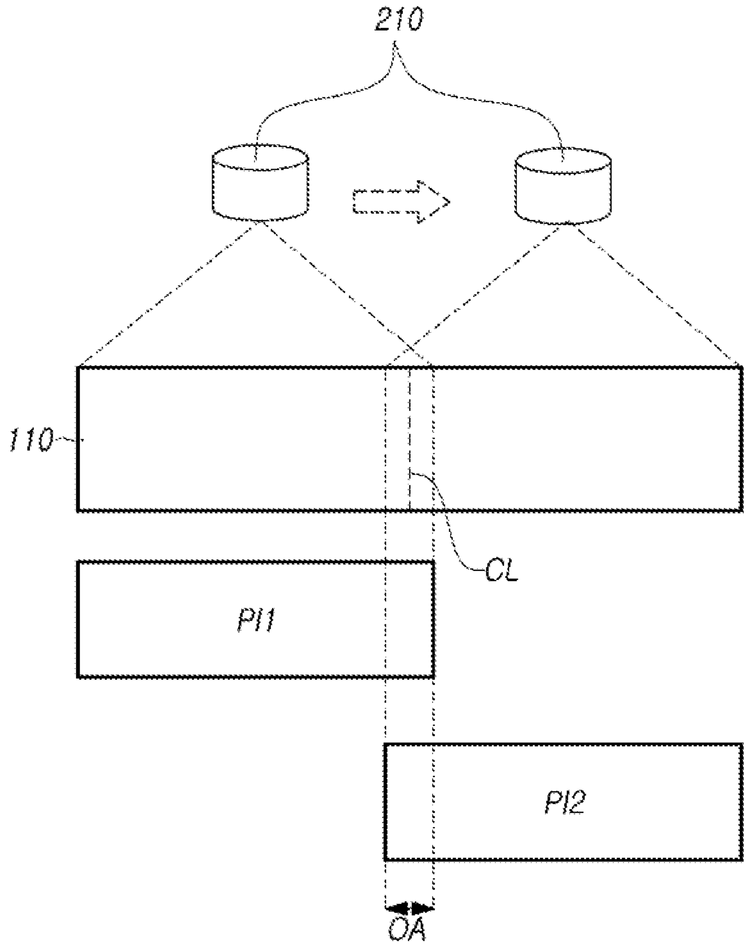
FIG. 3 is a view illustrating an example of generating a plurality of photographed images by capturing a large display panel twice.

FIG. 3 is a view illustrating an example of generating a plurality of photographed images by capturing a large display panel twice.

Referring to FIG. 3, the display area DA of the display panel 110 may be divided into a left area and a right area with respect to the center line CL. In this case, the optical compensation device 200 may extract the luminance data for the entire display panel 110 by extracting luminance data from a first photographed image PI1 photographed for the left area of the display panel 110 and a second photographed image PI2 photographed for the right area.

However, a partially overlapping area OA between the first photographed image PI1 photographed for the left area and the second photographed image PI2 photographed for the right area should be present near the center line CL to prevent an area, not photographed by the camera 210, from existing near the center line CL during the process of generating the plurality of photographed images PI1 and PI2.

As such, when the plurality of photographed images PI1 and PI2 are formed to have the overlapping area OA, a deviation in luminance data occurs due to the overlap between the first photographed image PI1 and second photographed image PI2 for the overlapping area OA.

As a result, an error occurs in the compensation data CD for the overlapping area OA, deteriorating image quality.

The optical compensating system of the disclosure may extract the camera gamma value by photographing the display panel 110 which displays test images with different grayscales using the camera 210, and mitigate the luminance deviation in the overlapping area OA where the photographed images overlap, by way of it, thereby enhancing the accuracy of the compensation data CD provided to the display device 100.

Figure 4:
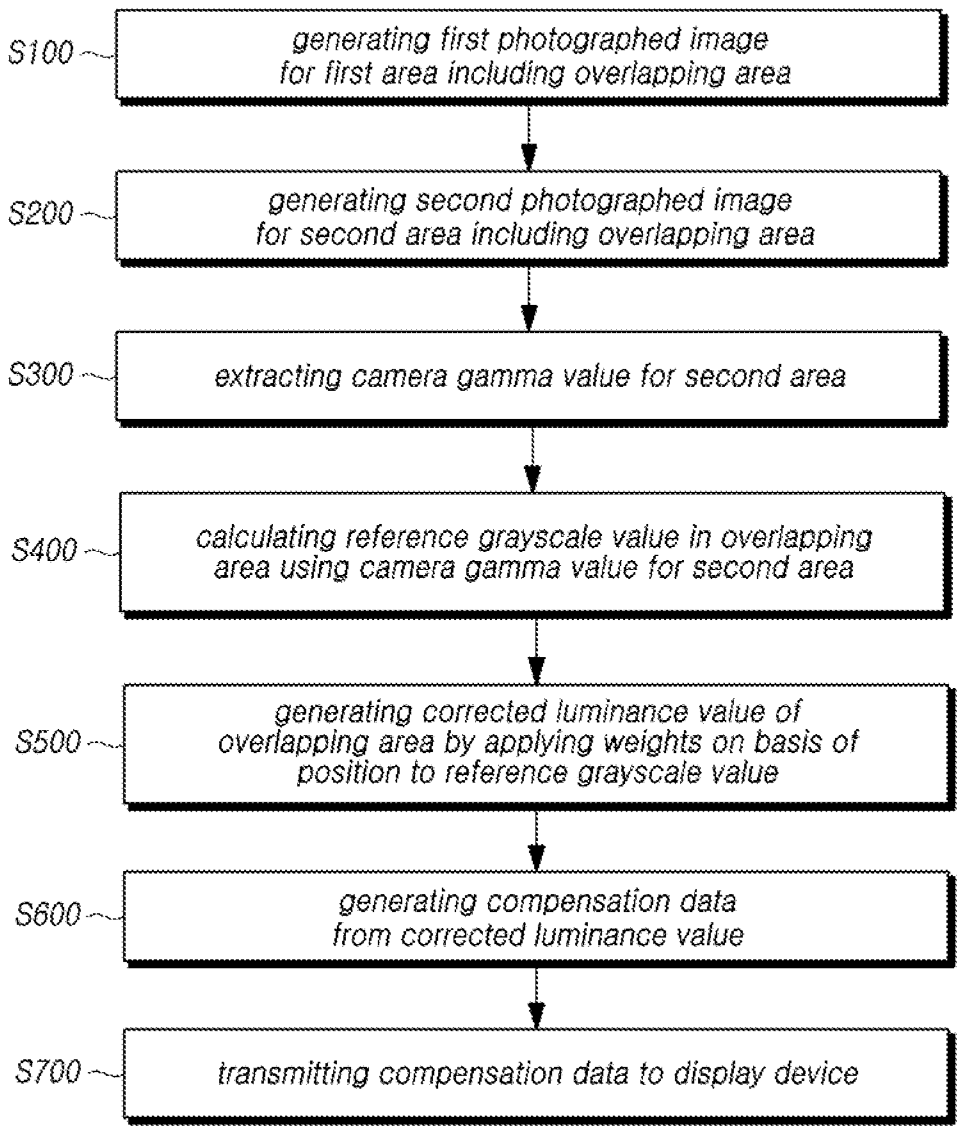
FIG. 4 is a flowchart illustrating an optical compensating method according to embodiments of the disclosure.

FIG. 4 is a flowchart illustrating an optical compensating method according to embodiments of the disclosure.

Referring to FIG. 4, an optical compensating method according to embodiments of the disclosure may include a step S100 of generating a first photographed image for a first area including an overlapping area OA, a step S200 of generating a second photographed image for a second area including the overlapping area, a step S300 of extracting a camera gamma value for the second area, a step S400 of calculating a reference grayscale value in the overlapping area using the camera gamma value for the second area, a step S500 of generating a corrected luminance value of the overlapping area by applying weights on the basis of the position to the reference grayscale value, a step S600 of generating compensation data CD from the corrected luminance value, and a step S700 of transmitting the compensation data CD to the display device 100.

The optical compensating method of the disclosure may mitigate the luminance deviation in the overlapping area OA by using the camera gamma value for the luminance of the camera 210.

Figure 5:
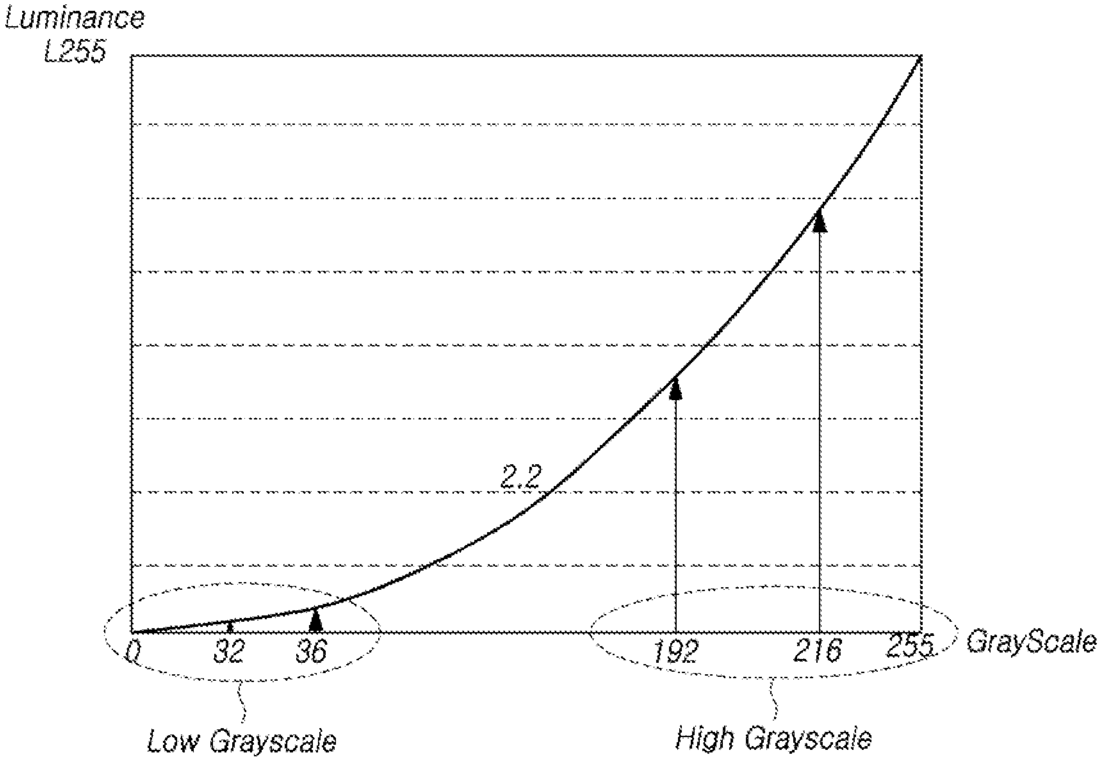
FIG. 5 is a view illustrating an example gamma curve used for optical compensation.

FIG. 5 is a view illustrating an example gamma curve used for optical compensation.

Referring to FIG. 5, the gamma curve is a graph showing the relationship between the luminance values according to the grayscale values of the input signal, and the luminance value L according to the grayscale value GS is expressed as follows.

$$L = L255 \times \left(\frac{GS}{255}\right)^{GM} \quad \text{(Equation 1)}$$

Here, L255 is the greatest luminance value corresponding to the 255 grayscale value, and may correspond to 1 when the luminance value is normalized to a value between 0 and 1. GM is the gamma value representing the slope of the luminance value for the grayscale value and is typically 2.2 which is a fixed value in the display panel 110.

This gamma curve may be stored as a look-up table (LUT).

In this case, since the low grayscale characteristics and the high grayscale characteristics of the display device 100 are different in the optical compensating method of the disclosure, compensation data in the low grayscale area and compensation data in the high grayscale area may be separately applied. In other words, the optical compensating method of the disclosure may separately extract the gamma value for the low grayscale area of 40 grayscale or less and the gamma value for the high grayscale area of 150 grayscale or more and apply different compensation data CD depending on the grayscale of the video image displayed on the display panel 110.

To that end, a process of generating compensation data using a low-grayscale test image and a process of generating compensation data using a high-grayscale test image may be separately performed.

For example, a first photographed image PI1 and a second photographed image PI2 may be generated for a first low-grayscale level of 32 grayscale and a second low-grayscale level of 36 grayscale, respectively, and a first photographed image PI1 and a second photographed image PI2 may be generated for a first high-grayscale level of 192 grayscale and a second high-grayscale level of 216 grayscale, respectively.

However, the process of generating compensation data for the low-grayscale area is primarily described here.

The step S100 of generating the first photographed image for the first area including the overlapping area is the step of generating the first photographed image by photographing the first area of the display panel 110 with the camera 210.

The step S200 of generating the second photographed image for the second area including the overlapping area is the step of generating the second photographed image by photographing the second area of the display panel 110 with the camera 210.

Figure 6:
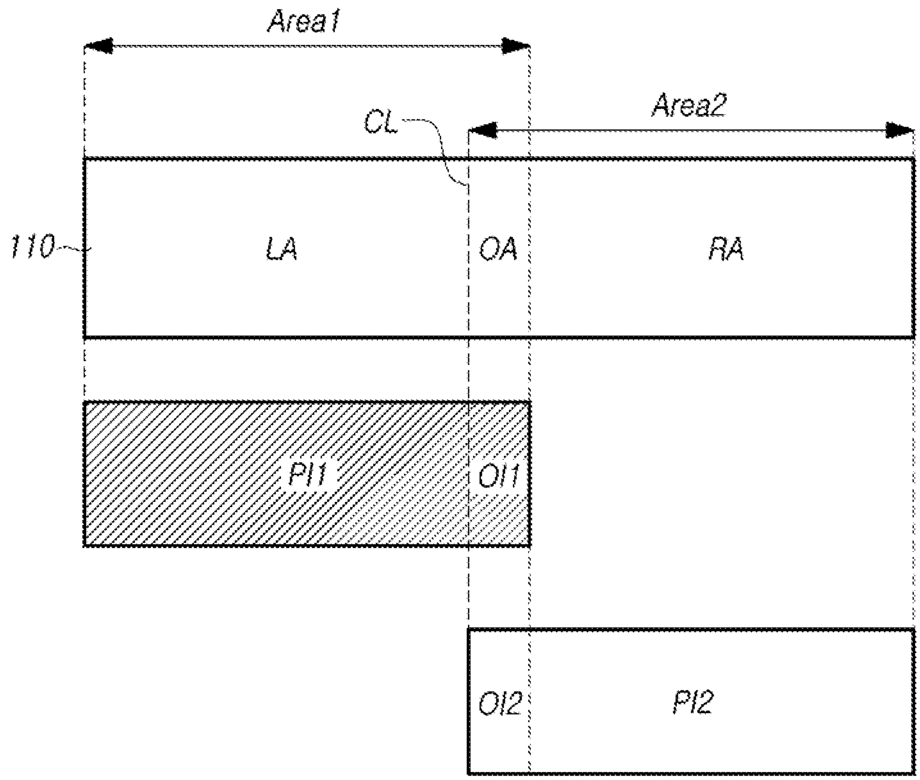
FIG. 6 is a view illustrating a process for generating a first photographed image for a first area in an optical compensating method according to embodiments of the disclosure.

FIG. 6 is a view illustrating a process for generating a first photographed image for a first area and a second photographed image for a second area in an optical compensating method according to embodiments of the disclosure.

Referring to FIG. 6, the optical compensating method according to embodiments of the disclosure may generate a first photographed image PI1 by photographing a first area Area1 of the display panel 110 to include an overlapping area OA.

The optical compensating method may also generate a second photographed image PI2 by photographing a second area Area2 of the display panel 110 to include the overlapping area OA.

Here, the area where the first photographed image PI1 and the second photographed image PI2 overlap is the overlapping area OA. Further, the area on the left side of the overlapping area OA is a left area LA, and the area on the right side of the overlapping area OA is a right area RA.

The overlapping area OA may have a constant area extending from the center line CL of the display panel to the second area Area2. In this case, the first area Area1 corresponds to an area including both the left area LA which is ½ of the left side of the display panel 110 and the overlapping area OA.

Accordingly, the first photographed image PI1 may include an image corresponding to the left area LA of the display panel 110 and a first overlapping image OI1 corresponding to the overlapping area OA.

In contrast, the second area Area2 is an area corresponding to ½ of the right side of the display panel and includes the overlapping area OA and the right area RA. Accordingly, the second photographed image PI2 may include an image corresponding to the right area RA and a second overlapping image OI2 corresponding to the overlapping area OA.

In this case, the right boundary of the first area Area1 may correspond to the right boundary of the overlapping area OA, and the left boundary of the second area Area2 may correspond to the center line CL corresponding to the left boundary of the overlapping area OA.

The optical compensating method of the disclosure may extract the camera gamma value for the first area Area1 or the camera gamma value for the second area Area2.

When extracting the camera gamma value for the first area Area1, the optical compensating method may calculate the corrected grayscale value for the overlapping area OA with respect to the right boundary of the first area Area1. On the other hand, when extracting the camera gamma value for the second area Area2, the optical compensating method may calculate the corrected grayscale value for the overlapping area OA by using the center line CL, corresponding to the left boundary of the second area Area2, as the reference line.

Meanwhile, the gamma value for the display panel 110 has a fixed value of, e.g., 2.2. However, if a fixed gamma value is used, an error may occur because the first photographed image PI1 and the second photographed image PI2 overlap in the overlapping area OA between the first area Area1 and the second area Area2.

Accordingly, the camera gamma value may be extracted for the luminance of the camera 210 for the second area Area2 and be used to calculate the corrected grayscale value for the overlapping area OA.

The step S300 of extracting the camera gamma value for the second area Area2 is the step of generating a plurality of photographed images by photographing on a plurality of grayscale levels for the same exposure time and extracting the camera gamma value therefrom. For example, the camera gamma value may be extracted using the second photographed image PI2 photographed for the same exposure time at the first low-grayscale level of 32 grayscale and the second low-grayscale level of 36 grayscale.

Figure 7:
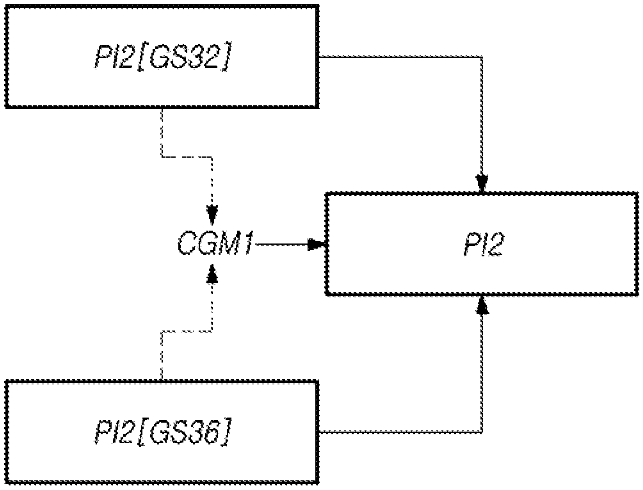
FIG. 7 is a view illustrating a process for extracting a camera gamma value in a second area for a low grayscale area in an optical compensating method according to embodiments of the disclosure.

FIG. 7 is a view illustrating a process for extracting a camera gamma value in a second area for a low grayscale area in an optical compensating method according to embodiments of the disclosure.

Referring to FIG. 7, an optical compensating method according to embodiments of the disclosure may generate a plurality of photographed images by photographing the second area at a plurality of grayscale levels for the same exposure time.

For example, when a test image of 32 grayscale is photographed with the camera 210, a second photographed image of 32 grayscale PI2[GS32] is generated. In this case, the camera luminance value CL32 for the second photographed image of 32 grayscale PI2[GS32] may be represented as follows.

$$CL32 = CL255 \times \left(\frac{32}{255}\right)^{CGM1} \quad \text{(Equation 2)}$$

Further, when a test image of 32 grayscale is photographed with the camera 210, a second photographed image PI2 of 36 grayscale [GS36] is generated. In this case, the camera luminance value CL36 for the second photographed image of 36 grayscale PI2[GS36] may be represented as follows.

$$CL36 = CL255 \times \left(\frac{36}{255}\right)^{CGM1} \quad \text{(Equation 3)}$$

Here, CL255 is the greatest camera luminance value corresponding to the 255 grayscale value, and CGM1 is the camera gamma value in the low-grayscale area.

Since the second photographed image of 32 grayscale PI2[GS32] and the second photographed image of 36 grayscale PI2[GS36] are photographed with the same camera 210 for the same exposure time, the camera gamma value CGM1 in the low-grayscale area will have the same value at the 32 grayscale and the 36 grayscale.

Therefore, the camera gamma value CGM1 in the low-grayscale area may be calculated as follows.

$$\frac{CL32}{CL36} = \left(\frac{32}{36}\right)^{CGM1} \quad \text{(Equation 4)}$$

$$CGM1 = \frac{\log(CL32/CL36)}{\log(32/36)} \quad \text{(Equation 5)}$$

Further, a plurality of photographed images may be generated by photographing the second area Area2 at a plurality of high-grayscale levels for the same exposure time.

For example, when the second area Area2 is photographed at the first high-grayscale level of 192 grayscale and second high-grayscale level of 216 grayscale for the same exposure time, the camera gamma value CGM2 in the high-grayscale area may be represented as follows.

$$CGM2 = \frac{\log(CL192/CL216)}{\log(192/216)} \quad \text{(Equation 6)}$$

The step S400 of calculating a reference grayscale value in the overlapping area OA using the camera gamma value CGM for the second area Area2 is the step of calculating a reference grayscale value for the overlapping area OA by applying the camera gamma value CGM1 or CGM2.

When the camera gamma value of the low-grayscale area CGM1 is used, the reference grayscale value GSR for the overlapping area OA may be represented as follows.

$$GSR = GSS \times (PL1/PL2)^{(1/CGM1)} \quad \text{(Equation 7)}$$

Here, GSS is a selected grayscale value. For example, if the camera gamma value CGM1 of the low-grayscale area is extracted at the 32 grayscale level, the selected grayscale value GSS is 32. PL1 is the luminance value of the first overlapping image OI1 corresponding to the overlapping area OA, and PL2 is the luminance value of the second overlapping image OI2 corresponding to the overlapping area OA. In other words, the reference grayscale value GSR applies the reciprocal of the camera gamma value CGM1 to the ratio of the luminance value of the first overlapping image OI1 and the luminance value of the second overlapping image OI2, reflecting the grayscale deviation between the first overlapping image OI1 and the second overlapping image OI2.

Further, when the camera gamma value of the high-grayscale area CGM2 is used, the reference grayscale value GSR for the overlapping area OA may be represented as follows.

$$GSR = GSS \times (PL1/PL2)^{(1/CGM2)} \quad \text{(Equation 8)}$$

Here, GSS is a selected grayscale value. For example, if the camera gamma value CGM2 of the high-grayscale area is extracted at the 192 grayscale level, the selected grayscale value GSS is 192.

When the overlapping area OA is formed in the right direction from the center line CL, the reference grayscale value GSR may be a grayscale value corresponding to the center line CL corresponding to the reference line.

The step S500 of generating the corrected luminance value of the overlapping area OA by applying weights on the basis of the position to the reference grayscale value GSR is the step of applying the reference grayscale value GSR to the second overlapping image OI2 with a different weight applied depending on the position in the overlapping area OA.

Figure 8:
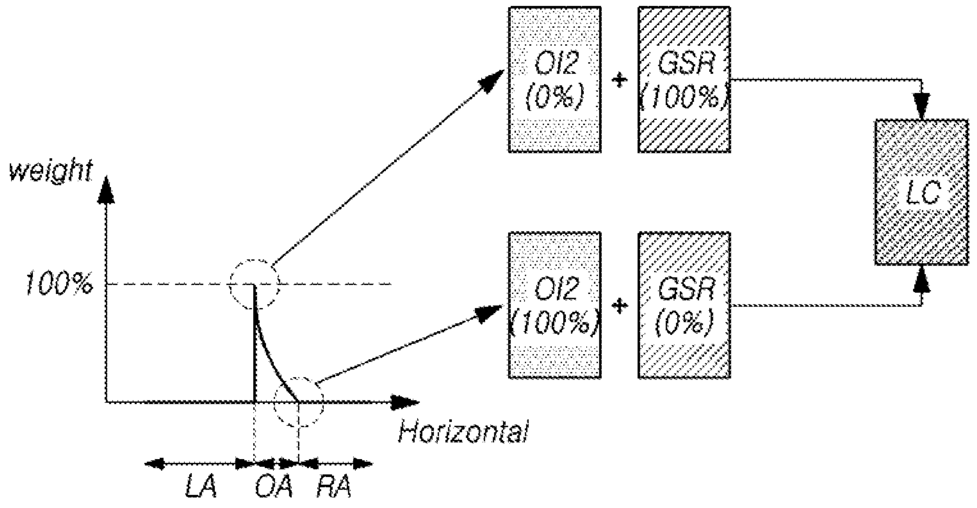
FIG. 8 is a view illustrating an example process for generating a corrected grayscale value of an overlapping area by applying weights on the basis of the position to a reference grayscale value in an optical compensating method according to embodiments of the disclosure.

FIG. 8 is a view illustrating an example process for generating a corrected luminance value of an overlapping area by applying weights on the basis of the position to a reference grayscale value in an optical compensating method according to embodiments of the disclosure.

Referring to FIG. 8, an optical compensating method according to embodiments of the disclosure may generate the corrected luminance value LC for the overlapping area OA by applying the reference grayscale value GSR to the luminance value of the second overlapping image OI2.

As described above, when extracting the camera gamma value CGM for the second area Area2, the optical compensating method may calculate the corrected luminance value LC for the overlapping area OA by using the center line CL, corresponding to the left boundary of the second area Area2, as the reference line.

In this case, since the reference grayscale value GSR is a grayscale value reflecting the deviation of the center line CL area which corresponds to the reference line, it exhibits the grayscale value of the center line CL area which corresponds to the left boundary of the overlapping area OA if the reference grayscale value GSR is 100% reflected. In contrast, if the reference grayscale value GSR is 0% reflected, it exhibits the grayscale value of the area corresponding to the right boundary of the overlapping area OA.

For example, for any position in the overlapping area OA, a first weight W1 is applied to the luminance value of the second overlapping image OI2 to generate a weighted luminance value. Further, for the same position, a second weight W2 is applied to the reference grayscale value GSR, converting the reference grayscale value GSR into a reference luminance value. In this case, the second weight W2 is 1 minus the first weight W1.

The corrected luminance value LC may be generated by summing the weighted luminance value in the overlapping area OA and the reference luminance value.

In this case, the weights W1 and W2 applied to the left boundary and the right boundary of the overlapping area OA are, in some implementations, varied non-linearly depending on positions in the overlapping area OA, considering the curved shape of the gamma curve.

As such, at the left boundary of the overlapping area OA, a weight of 1 is assigned to the reference grayscale value GSR, and a weight of 0 is assigned to the luminance value of the second overlapping image OI2. On the other hand, at the right boundary of the overlapping area OA, a weight of 0 is assigned to the reference grayscale value GSR, and a weight of 1 is assigned to the luminance value of the second overlapping image OI2.

Meanwhile, from the left boundary (e.g., the center line CL) of the overlapping area OA to the right, the weight of the reference grayscale value GSR is gradually decreased, and the weight for the luminance value of the second overlapping image OI2 is increased by the decrease in the weight of the reference grayscale value GSR.

If the luminance value of the second overlapping image OI2 and the weight of the reference grayscale value GSR are so varied, the sum of the luminance value of the second overlapping image OI2 and the weight of the reference grayscale value GSR for the entire overlapping area OA is 1. Accordingly, for the overlapping area OA, the corrected luminance value LC where the luminance value of the second overlapping image OI2 does not overlap the reference grayscale value GSR may be obtained.

Figure 9:
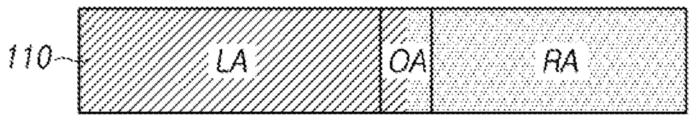
FIG. 9 is a view illustrating example panel luminance data for an entire area of a display panel in an optical compensating method according to embodiments of the disclosure.

FIG. 9 is a view illustrating an example corrected luminance value for an entire area of a display panel in an optical compensating method according to embodiments of the disclosure.

Referring to FIG. 9, in the optical compensating method according to embodiments of the disclosure, as the grayscale deviation between the first area Area1 and the overlapping area OA decreases at the left boundary of the overlapping area OA, and the grayscale deviation between the overlapping area OA and the second area Area2 decreases at the right boundary, a natural luminance variation may occur in the overlapping area OA.

The step S600 of generating the compensation data CD from the corrected luminance value LC is the step of generating compensation data CD to be used in the display device 100 using the corrected luminance value LC for the entire area of the display panel 110.

As described above, the compensation data CD may be generated for each of the low-grayscale area and the high-grayscale area.

For example, when the display panel 110 is represented in 255 grayscales, low-grayscale compensation data may be generated using a low-grayscale test image of 40 grayscale or less, and high-grayscale compensation data may be generated using a high-grayscale test image of 150 grayscale or more.

The step S700 of transmitting the compensation data CD to the display device 100 is the step of storing the compensation data CD generated in the optical compensation device 200 in the memory 142 of the display device 100.

In this case, the memory 142 of the display device 100 may store low-grayscale compensation data and high-grayscale compensation data and apply different compensation data CD depending on the grayscale of the video image displayed on the display panel 110.

Figure 10:
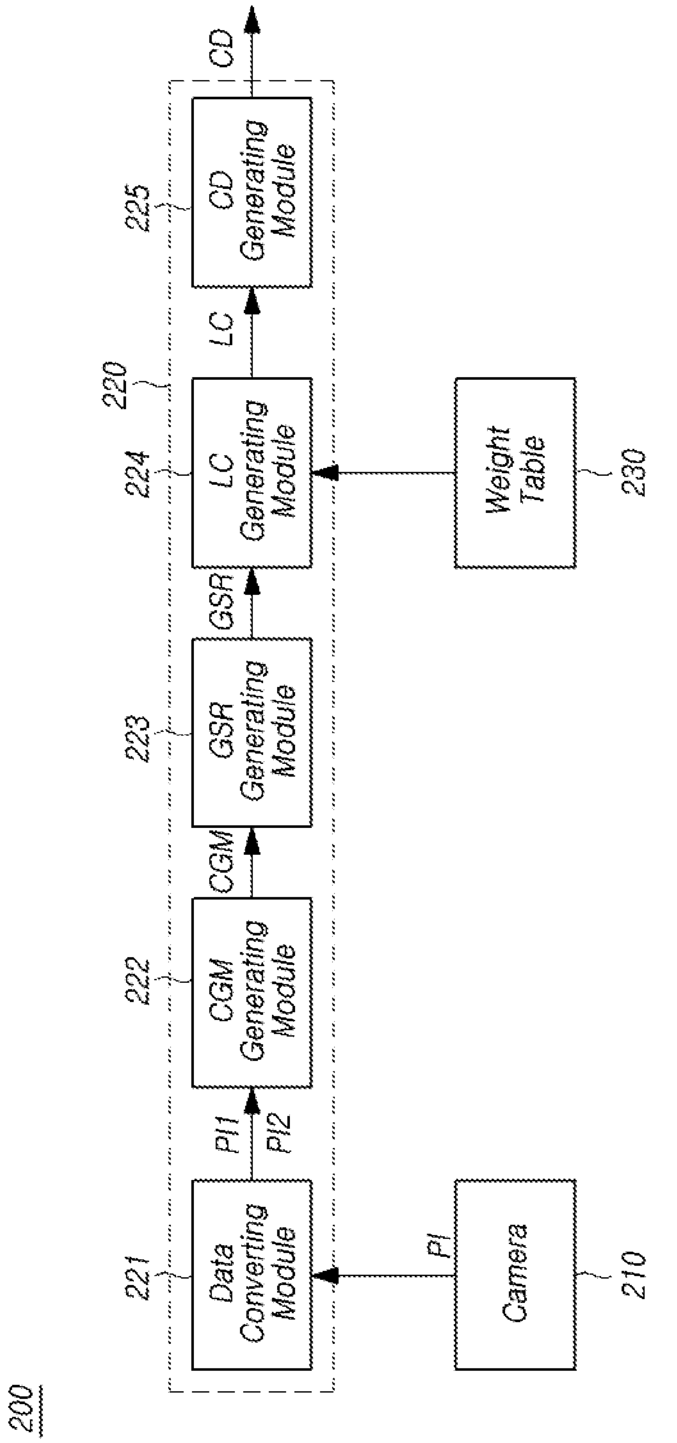
FIG. 10 is a block diagram illustrating an optical compensation device according to embodiments of the disclosure.

FIG. 10 is a block diagram illustrating an optical compensation device according to embodiments of the disclosure.

Referring to FIG. 10, an optical compensation device 200 according to embodiments of the disclosure may include a camera 210, a compensation data processing unit 220, and a weight table 230.

The camera 210 photographs the test image displayed on the display panel 110 of the display device 100, generating the photographed image PI.

For example, the optical compensation device 200 may provide a test image including a plurality of dot-shaped calibration points in a test color of black or white and generate a first photographed image PI1 and a second photographed image PI2 by photographing the first area Area1 and the second area Area2 through the camera 210.

In this case, the test image may be generated in the optical compensation device 200 and applied to the display device 100, or may be transferred to the display device from an external host system. When the test image is generated in the optical compensation device 200, the optical compensation device 200 may further include a test image generating module for generating the test image.

The photographed images PI1 and PI2 may include luminance information about the plurality of subpixels SP disposed in the display area of the display panel 110.

The compensation data processing unit 220 may include a data converting module 221 that converts the first photographed image PI1 and the second photographed image PI2 into luminance data, a camera gamma value generating module 222 that generates the camera gamma value CGM from the second photographed image PI2, a reference grayscale value generating module 223 that generates the reference grayscale value GSR of the overlapping area OA using the camera gamma value CGM, a corrected luminance value generating module 224 that generates the corrected luminance value LC of the overlapping area OA by applying weights on the basis of the position to the reference grayscale value GSR, and a compensation data generating module 225 that generates the compensation data CD.

The data converting module 221 converts each of the first photographed image PI1 photographed for the first area Area1 including the overlapping area OA on the display panel and the second photographed image PI2 photographed for the second area Area2 including the overlapping area OA into luminance data.

In this case, the first photographed image PI1 and the second photographed image PI2 may be generated for the low-grayscale area and the high-grayscale area, respectively. Further, the second photographed image PI2 may be photographed, for the same exposure time, for at least two grayscale levels to generate the camera gamma value CGM. In other words, in the low-grayscale area, the second photographed image PI2 may be generated for two grayscale levels, and in the high-grayscale area, the second photographed image PI2 may be generated for two grayscale levels.

The camera gamma value generating module 222 generates the camera gamma value CGM using the plurality of second photographed images PI2 for the second area Area2.

The reference grayscale value generating module 223 generates the reference grayscale value GSR for the overlapping area OA using the camera gamma value CGM generated for the low-grayscale area or high-grayscale area.

The corrected luminance value generating module 224 generates the corrected luminance value LC for the overlapping area OA by applying weights on the basis of the position to the reference grayscale value GSR. The corrected luminance value generating module 224 may extract the weights according to the positions in the overlapping area OA from the weight table 230 and apply it to the reference grayscale value GSR, generating the corrected luminance value LC.

The compensation data generating module 225 generates the compensation data CD using the corrected luminance value LC.

The optical compensating system of the disclosure may adjust the grayscale value in the overlapping area OA using the camera gamma value CGM for camera luminance for a plurality of photographed images PI1 and PI2 having the overlapping area OA, thereby mitigating the luminance deviation in the overlapping area OA.

Embodiments of the disclosure described above are briefly described below.

An optical compensating method according to embodiments of the disclosure may comprise generating a first photographed image for a first area of a display panel including an overlapping area, generating a second photographed image for a second area of the display panel including the overlapping area, extracting a camera gamma value for the second area, calculating a reference grayscale value in the overlapping area, using the camera gamma value for the second area, generating a corrected luminance value of the overlapping area by applying weights on the basis of the position to the reference grayscale value, generating compensation data from the corrected luminance value, and transmitting the compensation data to a display device.

The overlapping area may extend from a reference line of the display panel to the second area by a predetermined distance.

The reference line may be a center line of the display panel.

The second photographed image may be generated two or more times at different grayscale levels in a low-grayscale area of 40 grayscale or less, or a high-grayscale area of 150 grayscale or more.

The second photographed image may be photographed, for the same exposure time, at a first low-grayscale level of 32 grayscale and a second low-grayscale level of 36 grayscale.

The camera gamma value for the low-grayscale area CGM1 may be calculated as $$CGM1 = \frac{\log\left(\frac{CL32}{CL36}\right)}{\log\left(\frac{32}{36}\right)},$$

where CL32 is a camera luminance value of 32 grayscale, and CL36 is a camera luminance value of 36 grayscale.

The second photographed image may be photographed, for the same exposure time, at a first high-grayscale level of 192 grayscale and a second high-grayscale level of 216 grayscale.

The camera gamma value for the high-grayscale area CGM2 may be calculated as $$CGM2 = \frac{\log\left(\frac{CL192}{CL216}\right)}{\log\left(\frac{192}{216}\right)},$$

where CL192 may be a camera luminance value of 192 grayscale, and CL216 may be a camera luminance value of 216 grayscale.

The reference grayscale value GSR for the overlapping area may be calculated as $GSR=32\times(PL1/PL2)^{(1/CGM1)}$, where PL1 may be a luminance value corresponding to the overlapping area in the first photographed image, and PL2 may be a luminance value corresponding to the overlapping area in the second photographed image.

The reference grayscale value GSR for the overlapping area may be calculated as $GSR=192\times(PL1/PL2)^{(1/CGM2)}$, where PL1 may be a luminance value corresponding to the overlapping area in the first photographed image, and PL2 may be a luminance value corresponding to the overlapping area in the second photographed image.

Generating the corrected luminance value may include generating a weighted luminance value by applying a first weight to a luminance value corresponding to the overlapping area in the second photographed image, generating a reference luminance value by applying a second weight to the reference luminance value, and adding the weighted luminance value and the reference luminance value. A sum of the first weight and the second weight may be 1.

In generating the corrected luminance value, at a left boundary of the overlapping area, the first weight may be 100%, and the second weight may be 0%, and at a right boundary of the overlapping area, the first weight may be 0%, and the second weight may be 100%.

The first weight and the second weight may be non-linearly varied depending on positions between the left boundary and right boundary of the overlapping area.

The compensation data may include first compensation data for the low-grayscale area of 40 grayscale or less, and second compensation data for the high-grayscale area of 150 grayscale or more.

An optical compensation device according to embodiments of the disclosure may comprise a camera generating a photographed image for a display panel displaying a test image, a data converting module converting a first photographed image for a first area of the display panel including an overlapping area and a second photographed image for a second area of the display panel including the overlapping area into luminance data, a camera gamma value generating module generating a camera gamma value from the second photographed image, a reference grayscale value generating module generating a reference grayscale value of the overlapping area using the camera gamma value, a corrected luminance value generating a corrected luminance value of the overlapping area by applying weights on the basis of the position to the reference grayscale value, a compensation data generating module generating compensation data using the corrected luminance value, and a weight table storing the weight.

The optical compensation device may further comprise a test image generating module generating the test image.

A display device according to embodiments of the disclosure may comprise a display panel including a plurality of subpixels having a light emitting element, a gate driving circuit supplying a plurality of scan signals to the display panel, a data driving circuit supplying a data voltage to the display panel, a memory storing compensation data, and a timing controller compensating for the data voltage using the compensation data, wherein the compensation data is generated by generating a first photographed image for a first area of the display panel including an overlapping area, generating a second photographed image for a second area of the display panel including the overlapping area, extracting a camera gamma value for the second area, calculating a reference grayscale value in the overlapping area, using the camera gamma value for the second area, generating a corrected luminance value of the overlapping area by applying weights on the basis of the position to the reference grayscale value, and generating the compensation data from the corrected luminance value.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical compensating method, comprising:

generating a first photographed image for a first area of a display panel including an overlapping area;

generating a second photographed image for a second area of the display panel including the overlapping area;

extracting a camera gamma value for the second area;

calculating a reference grayscale value in the overlapping area, using the camera gamma value for the second area;

generating a corrected luminance value of the overlapping area by applying a weight on the basis of a position to the reference grayscale value;

generating compensation data from the corrected luminance value; and transmitting the compensation data to a display device.

2. The optical compensating method of claim 1, wherein the overlapping area extends from a reference line of the display panel to the second area by a determined distance.

3. The optical compensating method of claim 1, wherein the reference line is a center line of the display panel.

4. The optical compensating method of claim 1, wherein the second photographed image is generated for two or more times at different grayscale levels in a low-grayscale area of 40 grayscale or less or in a high-grayscale area of 150 grayscale or more.

5. The optical compensating method of claim 4, wherein the second photographed image is photographed, for a same exposure time, at a first low-grayscale level of 32 grayscale and a second low-grayscale level of 36 grayscale.

6. The optical compensating method of claim 5, wherein the camera gamma value (CGM1) for the low-grayscale area is calculated as $$CGM1 = \frac{\log\left(\frac{CL32}{CL36}\right)}{\log\left(\frac{32}{36}\right)},$$

wherein CL32 is a camera luminance value of 32 grayscale, and CL36 is a camera luminance value of 36 grayscale.

7. The optical compensating method of claim 6, wherein the reference grayscale value (GSR) for the overlapping area is calculated as $GSR=32\times(PL1/PL2)^{(1/CGM1)}$, wherein PL1 is a luminance value corresponding to the overlapping area in the first photographed image, and PL2 is a luminance value corresponding to the overlapping area in the second photographed image.

8. The optical compensating method of claim 4, wherein the second photographed image is photographed, for a same exposure time, at a first high-grayscale level of 192 grayscale and a second high-grayscale level of 216 grayscale.

9. The optical compensating method of claim 8, wherein the camera gamma value (CGM2) for the high-grayscale area is calculated as $$CGM2 = \frac{\log\left(\frac{CL192}{CL216}\right)}{\log\left(\frac{192}{216}\right)},$$

wherein CL192 is a camera luminance value of 192 grayscale, and CL216 is a camera luminance value of 216 grayscale.

10. The optical compensating method of claim 9, wherein the reference grayscale value (GSR) for the overlapping area is calculated as $GSR=192\times(PL1/PL2)^{(1/CGM2)}$, wherein PL1 is a luminance value corresponding to the overlapping area in the first photographed image, and PL2 is a luminance value corresponding to the overlapping area in the second photographed image.

11. The optical compensating method of claim 1, wherein generating the corrected luminance value includes:

generating a weighted luminance value by applying a first weight to a luminance value corresponding to the overlapping area in the second photographed image;

generating a reference luminance value by applying a second weight to the reference luminance value; and adding the weighted luminance value and the reference luminance value, wherein a sum of the first weight and the second weight is 1.

12. The optical compensating method of claim 11, wherein in generating the corrected luminance value, at a left boundary of the overlapping area, the first weight is 100% and the second weight is 0%, and at a right boundary of the overlapping area, the first weight is 0% and the second weight is 100%.

13. The optical compensating method of claim 12, wherein the first weight and the second weight non-linearly vary based on positions between the left boundary and right boundary of the overlapping area.

14. The optical compensating method of claim 1, wherein the compensation data includes:

first compensation data for a low-grayscale area of 40 grayscale or less; and second compensation data for a high-grayscale area of 150 grayscale or more.

15. An optical compensation device, comprising:

a camera configured to generate a photographed image of a display panel displaying a test image;

a data converting module configured to convert a first photographed image of a first area of the display panel including an overlapping area and a second photographed image of a second area of the display panel including the overlapping area into luminance data;

a camera gamma value generating module configured to generate a camera gamma value from the second photographed image;

a reference grayscale value generating module configured to generate a reference grayscale value of the overlapping area using the camera gamma value;

a corrected luminance value generating module configured to generate a corrected luminance value of the overlapping area by applying weights on the basis of a position to the reference grayscale value;

a compensation data generating module configured to generate compensation data using the corrected luminance value; and a weight table configured to store the weights.

16. The optical compensation device of claim 15, further comprising a test image generating module configured to generate the test image.

17. A display device, comprising:

a display panel including a plurality of subpixels having a light emitting element;

a gate driving circuit configured to supply a plurality of scan signals to the display panel;

a data driving circuit configured to supply a data voltage to the display panel;

a memory configured to store compensation data; and a timing controller configured to compensate for the data voltage using the compensation data, wherein the compensation data is generated by:

generating a first photographed image for a first area of the display panel including an overlapping area;

generating a second photographed image for a second area of the display panel including the overlapping area;

extracting a camera gamma value for the second area;

calculating a reference grayscale value in the overlapping area, using the camera gamma value for the second area;

generating a corrected luminance value of the overlapping area by applying a weight on the basis of a position to the reference grayscale value; and generating a compensation data from the corrected luminance value.

* * * * *